United States Patent
Hayotte

(10) Patent No.: US 6,352,311 B1
(45) Date of Patent: Mar. 5, 2002

(54) METHOD OF MANUFACTURING A BACKREST STRUCTURE FOR A VEHICLE SEAT AND BACKREST STRUCTURE OBTAINED BY THIS METHOD

(75) Inventor: Sébastien Hayotte, Puteaux (FR)

(73) Assignee: Bertrand Faure Equipments SA, Boulogne (FR)

( * ) Notice: Subject to any disclaimer, the term of this patent is extended or adjusted under 35 U.S.C. 154(b) by 0 days.

(21) Appl. No.: 09/455,101

(22) Filed: Dec. 6, 1999

(30) Foreign Application Priority Data

Dec. 4, 1998 (FR) .............................. 98 15343

(51) Int. Cl.[7] ................................. B60N 2/68
(52) U.S. Cl. .................. 297/452.2; 29/421.1; 29/897.2
(58) Field of Search .................. 297/452.18, 452.2; 29/421.1, 897.2; 72/58

(56) References Cited

U.S. PATENT DOCUMENTS

| 4,632,452 A | 12/1986 | Vogel | .................. 297/232 |
| 5,561,902 A | * 10/1996 | Jacobs et al. | .......... 29/421.1 X |
| 5,624,160 A | * 4/1997 | Koch et al. | ............... 297/452.2 |
| 5,645,316 A | * 7/1997 | Aufrere et al. | ...... 297/452.2 X |
| 5,685,614 A | 11/1997 | Chabanne | ................. 297/452.2 |
| 5,735,772 A | * 4/1998 | Clark et al. | .......... 297/452.2 X |
| 5,988,756 A | 11/1999 | Aufrere et al. | ........ 297/452.18 |
| 6,154,944 A | * 12/2000 | Mason et al. | ............... 29/421.1 |

FOREIGN PATENT DOCUMENTS

| EP | 0 197 167 | 10/1986 |
| EP | 0 749 867 | 12/1996 |
| FR | 2 753 935 | 4/1998 |

OTHER PUBLICATIONS

French Preliminary Search Report dated Aug. 24, 1999, Int'l. Appl. No. FR 9815343.

* cited by examiner

Primary Examiner—Peter R. Brown
(74) Attorney, Agent, or Firm—Marshall, Gerstein & Borun

(57) ABSTRACT

A backrest structure for a vehicle seat comprises two hydroformed, tubular, horizontal crosspieces and vertical uprights engaged without any clearance in orifices punched into these crosspieces during hydroforming.

10 Claims, 3 Drawing Sheets

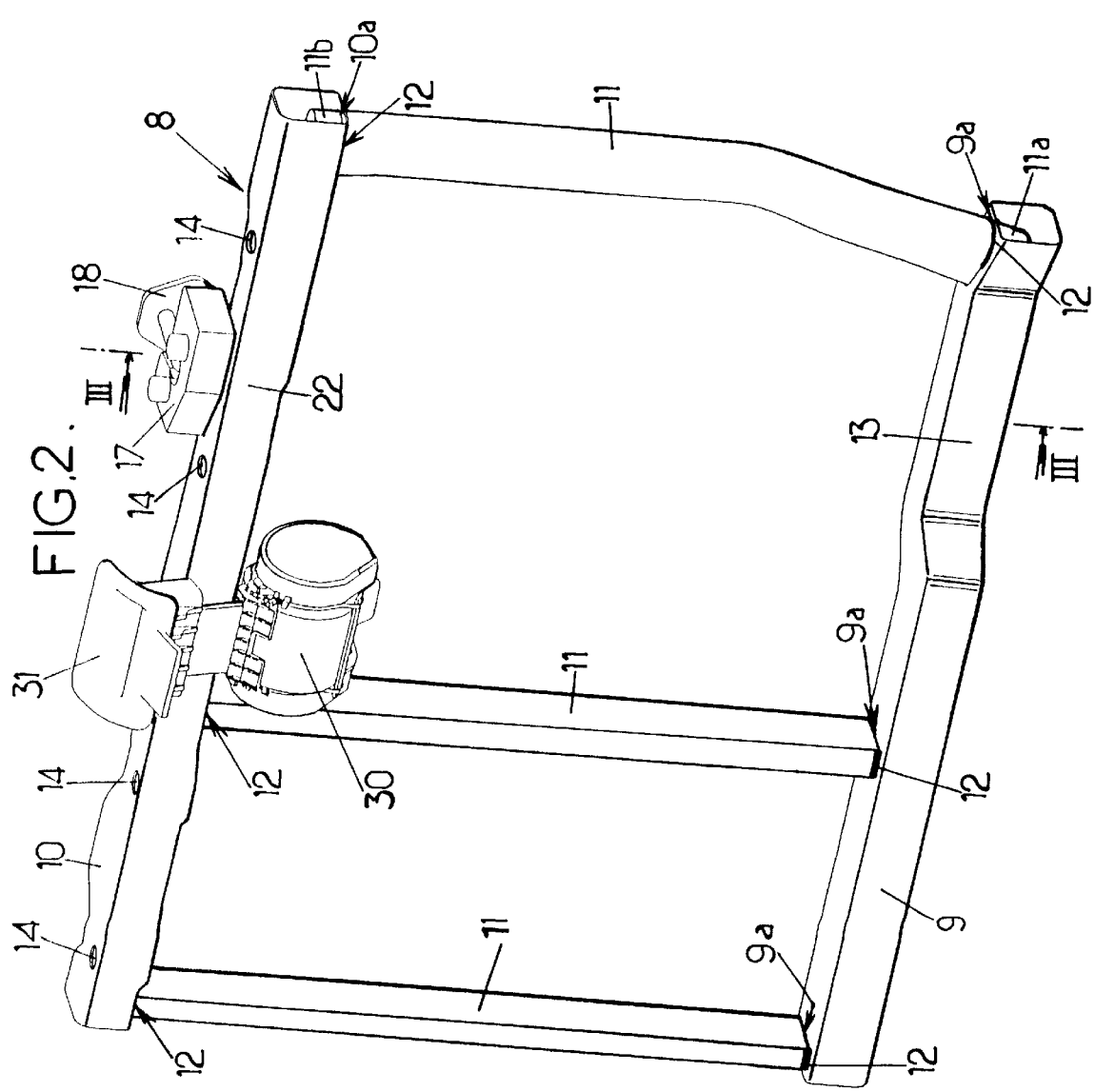

METHOD OF MANUFACTURING A BACKREST STRUCTURE FOR A VEHICLE SEAT AND BACKREST STRUCTURE OBTAINED BY THIS METHOD

FIELD OF THE INVENTION

The present invention relates to methods of manufacturing backrest structures of seats for vehicles and the backrest structures produced by this method.

More specifically, the invention relates to a method of manufacturing a backrest structure of a seat for a vehicle, this structure comprising:

- a tubular-shaped, rigid, bottom horizontal crosspiece delimiting a certain interior volume and comprising a bottom part and a top part,
- a tubular-shaped, rigid, top horizontal crosspiece delimiting a certain interior volume and comprising a bottom part and a top part,
- and at least first and second rigid, substantially vertical uprights, each of which extends between bottom and top ends joined respectively to the bottom and top crosspieces, said method comprising at least one step in which the bottom and top crosspieces are shaped by hydroforming.

BACKGROUND OF THE INVENTION

A method of this type is described in document FR-A2 753 935, for example, whereby one of the lateral uprights of the structure is made from a single piece with two crosspieces from a same tubular section, this unit then being welded onto the other lateral upright.

This method is quite satisfactory but has a disadvantage in that said other lateral upright can only be joined to the bottom and top crosspieces by welding, which is relatively expensive.

In addition, the weld seams are always critical points of the backrest structure and have to be controlled very carefully, thereby complicating the process of manufacturing the backrest structure.

These disadvantages are major under all circumstances but become critical if the backrest structure is made from aluminium or an aluminium-based alloy insofar as welding these materials is a particularly delicate operation.

OBJECTS AND SUMMARY OF THE INVENTION

The objective of the present invention is to overcome these drawbacks.

To this end, the invention proposes a method of the type outlined above, which is characterized in that when hydroforming the bottom crosspiece, whilst the interior volume of this bottom crosspiece is being filled with pressurized liquid, at least first and second pairs of orifices are punched into said bottom crosspiece, the first pair of orifices in the bottom crosspiece comprising two reciprocally matching orifices arranged respectively in the top part and in the bottom part of the bottom crosspiece and having sections matching the bottom end of the first upright, and the second pair of orifices of the bottom crosspiece comprising two reciprocally matching orifices arranged respectively in the top part and in the bottom part of the bottom crosspiece and having sections matching the bottom end of the second upright, in that when hydroforming the top crosspiece, as the interior volume of this top crosspiece is being filled with pressurized liquid, at least first and second pairs of orifices are punched into said top crosspiece, the first pair of orifices of the top crosspiece being two reciprocally matching orifices arranged respectively in the bottom part and in the top part of the top crosspiece and having sections matching the top end of the first upright and the second pair of orifices of the top crosspiece being two reciprocally matching orifices arranged respectively in the bottom part and in the top part of the top crosspiece and having sections matching the top end of the second upright, and in that the hydroforming step is followed by an assembly step, in which:

- the bottom ends of the first and second uprights are engaged without any clearance respectively in the first and second pairs of orifices of the bottom crosspiece,
- the top ends of the first and second uprights are engaged without any clearance respectively in the first and second pairs of orifices of the top crosspiece,
- and the uprights are definitively joined to the crosspieces in order to prevent the uprights from slipping out, mechanical strength essentially being imparted to the backrest structure by the location of the uprights in the crosspieces without any clearance.

As a result of these features, the mechanical strength of the backrest structure is essentially obtained by a location fit which is very easy to implement and control.

Optionally, weld seams or spots may be applied to join the uprights onto the crosspieces definitively but these welds have virtually no role to play with regard to the mechanical strength of the backrest and are therefore not critical points of the structure.

In any event, the welding will be on a much lesser scale than required by the methods the prior art.

Furthermore, the method proposed by the invention will easily absorb the manufacturing tolerances on the length of the vertical uprights of the backrest structure.

Furthermore, the same hydroforming equipment may be used to make backrest structures of the same external shape but incorporating material of differing thicknesses, which will reduce the cost of manufacturing backrest structures since a same backrest structure (for example, a backrest for "3 seater" vehicles and for "2 seater" vehicles in which the boot is not totally separated from the area reserved for the rear passengers).

Finally, the operation whereby orifices are punched into the crosspieces is a commonplace operation in the hydroforming process, which will be made no more complex or expensive as a result.

Optionally, the backrest structure may have at least two seats side by side, this structure having a third rigid, substantially vertical upright which extends between bottom and top ends joined respectively to the is bottom and top crosspieces, the method comprising the following additional steps:

- when hydroforming the bottom crosspiece, at least a third pair of orifices is punched into a top part of said bottom crosspiece, the third pair of orifices in the bottom crosspiece comprising two reciprocally matching orifices arranged respectively in the top part and in the bottom part of the bottom crosspiece and having sections matching the bottom end of the third upright,
- when hydroforming the top crosspiece, at least a third pair of orifices is punched into a bottom part of said top crosspiece, the third pair of orifices in the top crosspiece comprising two reciprocally matching orifices arranged respectively in the bottom part and in the top part of the top crosspiece and having sections matching the top end of the third upright, the bottom and top ends of the third upright are engaged without clearance respectively in the third pairs of orifices of the bottom and top crosspieces, and the third upright is definitively joined to the crosspieces in order to prevent the third upright from slipping out, mechanical strength essentially being imparted to the backrest structure by the location fit of the first, second and third uprights in the crosspieces without any clearance.

The invention also relates to a backrest structure produced by the method described above, this structure optionally comprising one and/or other of the following features:

the vertical uprights are definitively joined to the crosspieces by welding;

the vertical uprights are definitively joined to the crosspieces by clamping;

the backrest structure is made from steel;

the backrest structure is made from a material selected from aluminium and aluminium-based alloys;

the bottom and top crosspieces have gutters designed to attach a cap covering the backrest, these gutters being cast with said crosspieces from the same material;

the bottom crosspiece forms flanges designed for pivotally mounting the backrest on the vehicle, these flanges being cast with said bottom crosspiece from the same material;

the top crosspiece also has at least one additional punched orifice into which an element selected from the following is fixed:
a pin for a headrest,
a riveted fixing insert,
a backrest bolt,
a plate for a backrest bolt,
a mounting for a safety belt reel,
an outlet for a safety belt strap;

the backrest structure has at least one place for a user and the bottom crosspiece has a portion that is flattened on a substantially vertical plane on a level with this seat.

BRIEF DESCRIPTION OF THE DRAWINGS

Other features and advantages of the invention will become clear from the following description of several embodiments, given by way of example and not restrictive in any respect, which may be read in conjunction with the appended drawings.

Of the drawings:

FIG. 2 is a perspective view of a first embodiment of a rigid structure as proposed by the invention, which may be fitted at least in the widest part of the backrest of the seat illustrated in FIG. 1, FIG. 3 is a view in section along the line III—III of FIG. 2.

MORE DETAILED DESCRIPTION

The same references are used in the different drawings to denote the same or similar components.

Figure 1:
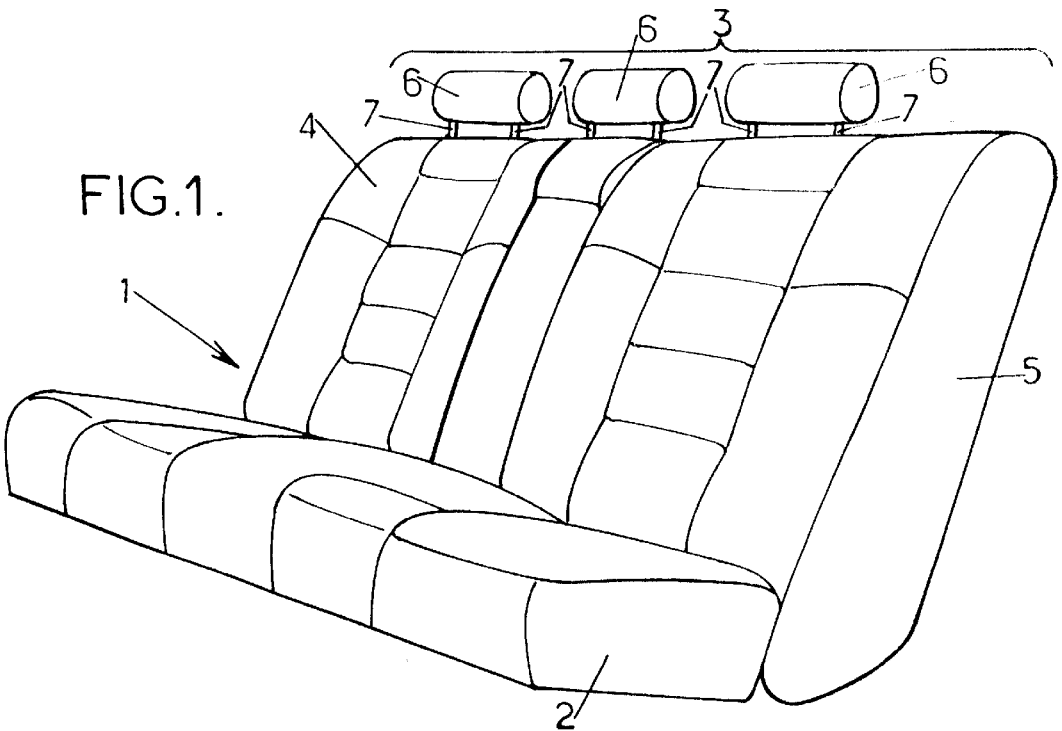
FIG. 1 is a perspective view of a seat, the backrest of which may have a structure as proposed by the invention.

FIG. 1 illustrates a seat for a motor vehicle 1, in this case a rear seat, comprising a seat part 2 and a backrest 3.

In the specific example illustrated here, the backrest 3 comprises two parts 4, 5, which form approximately ⅓ and ⅔ of the width of the backrest 3 respectively and which can be folded down forwards independently of one another. The part 4 of the backrest forms a side place for a single passenger whilst the part of the backrest forms two adjacent places, namely a side place and a centre place.

Each of the three places in the seat 1 is provided with a headrest 6, borne by two vertical metal pins 7 mounted on the rigid structure of the backrest.

As illustrated in FIGS. 2 and 3, the rigid metal frame 8 of the part 5 of the backrest comprises:
a bottom tubular crosspiece 9 which extends horizontally,
a top tubular crosspiece 10, which also extends horizontally,
and three substantially vertical tubular uprights 11.

These different parts of the frame 8 may be made from steel, for example, or alternatively from aluminium or an aluminium alloy.

Each upright 11 extends between a bottom end 1a engaged with no clearance in an orifice 9a provided in the top part of the bottom crosspiece 9 on the one hand and a top end 11b engaged without clearance in an orifice 10a provided in the bottom part of the top crosspiece 10.

For the purposes of the invention, at least the crosspieces 9, 10 are made by hydroforming, from tubular sections with a constant cross section, by inserting each of these tubular sections in a die and then injecting a liquid into the interior volume of this tubular section at high pressure, which deforms said section until it conforms to the internal shape of the die.

When said tubular sections have assumed the internal shape of the die and have been filled with pressurized liquid, the orifices 9a, 10a are formed by punching, by means of punches integrated in the die.

After engaging the uprights 11 in the crosspieces 9, 10, the uprights are definitively joined to the crosspieces by means of weld seams or weld spots 12, for example, which may be quite limited. In effect, the purpose of these weld seams or spots is essentially to prevent the uprights 11 from slipping out but not to impart any mechanical strength to the structure 8, this being mainly provided by the location fit of the uprights 11 in the crosspieces 9, 10.

As a result of the hydroforming process used for the crosspieces 9, 10, these crosspieces may be quite complex in shape and are optimized from the point of view of mechanical strength and as regards the space occupied by said crosspieces.

In particular, the bottom crosspiece 9 may have, on a level with the side place of the backrest part 5 (i.e. on a level with the place of this backrest part which is the most frequently used), a portion 13 which s flattened along a substantially vertical plane so as to be reduced in thickness between the front and rear end faces. This will guarantee that the bottom crosspiece 9 is arranged apart from the back of the passenger by a sufficient thickness of foam, thereby ensuring the comfort and safety of this passenger.

Furthermore, when hydroforming the crosspieces 9, 10, additional orifices may be provided in these crosspieces, again by punching.

Figure 4:
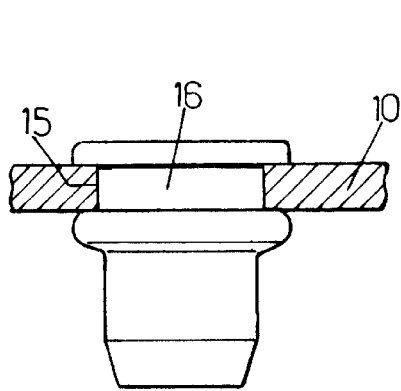
FIG. 4 is a detailed view of a fixing device provided on one of the crosspieces of the structure illustrate FIGS. 2 and 3.

Accordingly, the top crosspiece 10 may have, for example:

- vertical orifices 14 provided both in the top and bottom faces of the crosspiece 10 on a level with the centre place of the seat to receive the metal pins 7 bearing the headrest 6 corresponding to this place,
- additional orifices 15 in which internally threaded metal inserts 16 can be located such as that illustrated in FIG. 4, which inserts may constitute rivets which expand inside the tubular crosspiece 10 when a screw (not illustrated) used to fix an element onto the crosspiece 10 is driven in as it is screwed into the insert 16.

The elements which may be fixed onto the top crosspiece 10 comprise in particular a backrest bolt 17 designed to co-operate with a plate 18 fixed onto the body of the vehicle to lock the backrest part 5 into a raised position. Clearly, it would also be possible to fix the plate 18 onto the top crosspiece 10 by means of one or more inserts 16, in which case the bolt 17 is borne on the vehicle body.

In addition, the inserts 16 may also be used to fix onto the crosspiece 10 a mounting for a belt reel 30 for the centre safety belt of the seat 1, this mounting 30 co-operating with a strap outlet 31 for said centre safety belt.

Optionally, the belt outlet 31 could be provided in the form of slots (not illustrated) provided in the top and bottom faces of the crosspiece 10, these slots being internally lined with a plastic insert acting as a guide for the strap of the safety belt.

Figure 5:
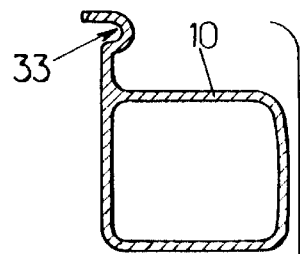
FIG. 5 is a vertical view in section of a second embodiment of the crosspieces of the backrest structure proposed by the invention.

If the structure 8 of the backrest is made from aluminium, the bottom 9 and top 10 crosspieces may advantageously have gutters 32, 33, as illustrated in FIG. 5. These gutters, which are preferably directed towards the rear, are designed for mounting a cap covering the backrest and are advantageously cast in the same material with the crosspieces 9, 10.

Furthermore, the bottom crosspiece 9 may have flanges 34, in each of which a horizontal bore 35 may be provided, for example, enabling the part 5 and the backrest to be pivotally mounted on the vehicle body. These flanges 34 are preferably cast from the same material with the bottom crosspiece 9.

Figure 6:
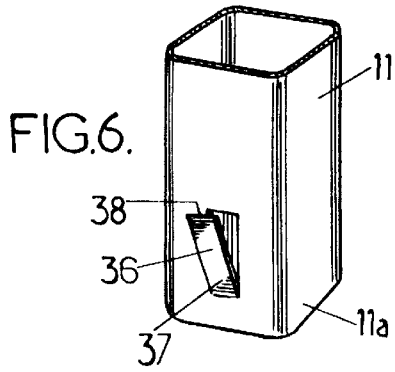
FIG. 6 is a perspective view of one end of one of to vertical uprights of the backrest structure in a third embodiment proposed by the invention.

As illustrated in FIG. 6, if the structure 8 is made from aluminium, the ends 11a, 11b of the uprights 11 may be provided with clamping devices which prevent these uprights from slipping out once located in the crosspieces 9, 10.

These clamping devices may be provided in the form of plastic inserts, for example, fixed to the ends of the uprights 11 or alternatively, as illustrated in FIG. 6, as resilient tongues 36 cut into the wall of the uprights 11.

Each of these tongues 36 extends longitudinally, parallel with the length of the uprights 11, from a first end 37 adjacent to the corresponding end 11a, 11b of the upright as far as a second free end, which is spaced slightly back towards the exterior of the upright 11.

It should be pointed out that, if necessary, a structure similar to that described above may be provided for the narrowest part 4 of the seat backrest or for a backrest of a single-place seat.

Figure 7:
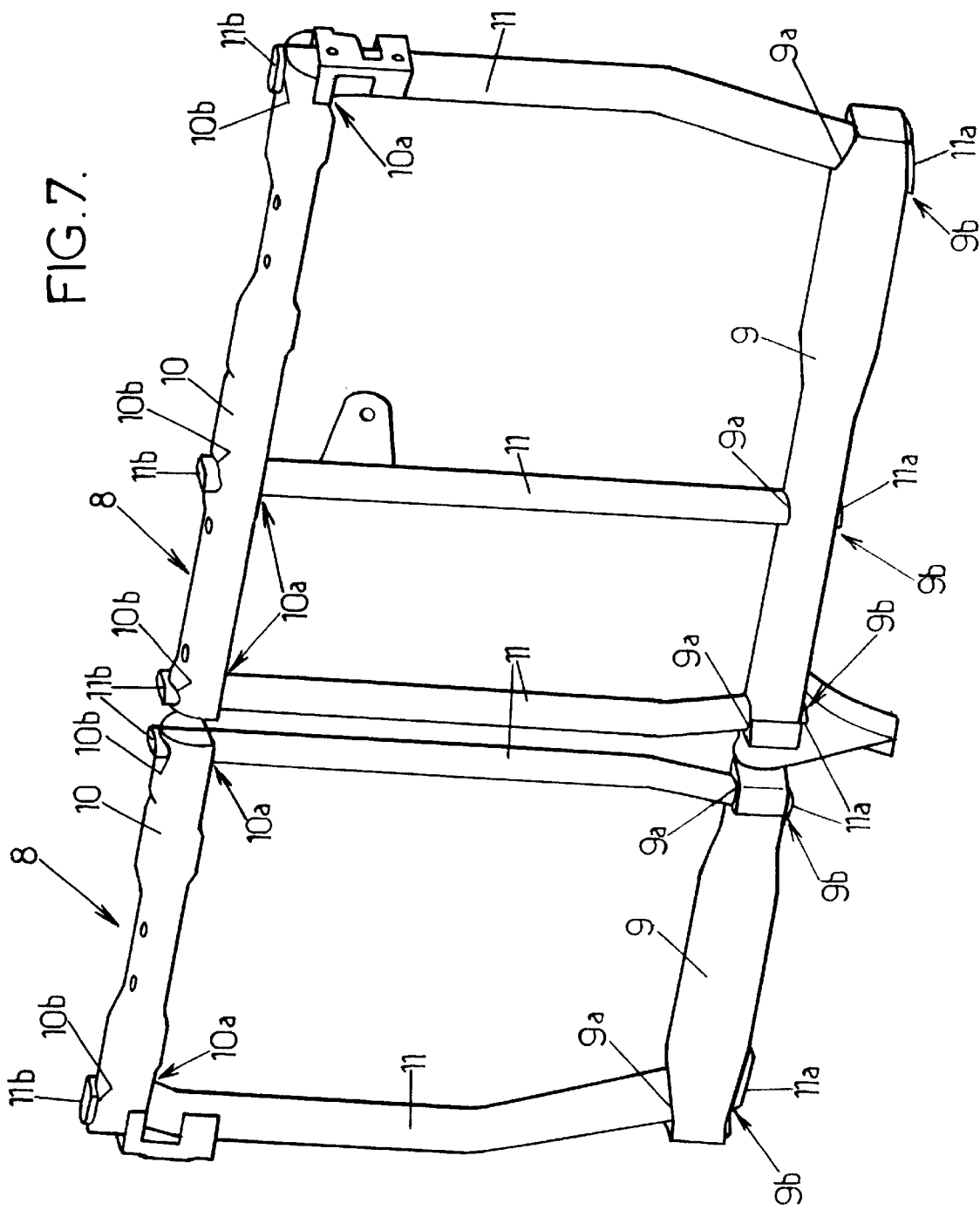
FIG. 7 is a perspective view illustrating the structures which may be used respectively for the two pivoting parts of the seat backrest illustrated in FIG. 1.

In the example illustrated in FIG. 7, the structures 8 of the two parts 4, 5 of the backrest each have uprights 11 engaged in hydroformed crosspieces 9, 10, as described above, but differing in that:

- the bottom end 11a of each upright 11 is located in two aligned orifices 9a, 9b in the crosspiece 9 so as to protrude from the bottom of this crosspiece,
- and the top end 11b of each upright 11 is located in two aligned orifices 10a, 10b in the crosspiece 10 so as to protrude from the top of this crosspiece.

I claim:

1. A method of manufacturing a backrest structure of a seat for a vehicle, this structure comprising:

a tubular-shaped, rigid, bottom horizontal crosspiece delimiting a certain interior volume and comprising a bottom part and a top part, a tubular-shaped, rigid, top horizontal crosspiece delimiting a certain interior volume and comprising a bottom part and a top part, and at least first and second rigid, substantially vertical uprights, each of which extends between bottom and top ends joined respectively to the bottom and top crosspieces, said method comprising at least one step in which the bottom and top crosspieces are shaped by hydroforming, characterized in that when hydroforming the bottom crosspiece, as the interior volume of this bottom crosspiece is being filled with pressurized liquid, at least first and second pairs of orifices are punched into said bottom crosspiece, the first pair of orifices in the bottom crosspiece comprising two reciprocally matching orifices arranged respectively in the top part and in the bottom part of the bottom crosspiece and having sections matching the bottom end of the first upright, and the second pair of orifices of the bottom crosspiece comprising two reciprocally matching orifices arranged respectively in the top part and in the bottom part of the bottom crosspiece and having sections matching the bottom end of the second upright, in that when hydroforming the top crosspiece, as the interior volume of this top crosspiece is being filled with pressurized liquid, at least first and second pairs of orifices are punched into said top crosspiece, the first pair of orifices of the top crosspiece comprising two reciprocally matching orifices arranged respectively in the bottom part and in the top part of the top crosspiece and having sections matching the top end of the first upright, and the second pair of orifices of the top crosspiece comprising two reciprocally matching orifices arranged respectively in the bottom part and in the top part of the top crosspiece and having sections matching the top end of the second upright, and in that the hydroforming step is followed by an assembly step, in which:

the bottom ends of the first and second uprights are engaged without any clearance respectively in the first and second pairs of orifices of the bottom crosspiece, the top ends of the first and second uprights are engaged without any clearance respectively in the first and second pairs of orifices of the top crosspiece, and the uprights are definitively joined to the crosspieces in order to prevent the uprights from slipping out, mechanical strength essentially being imparted to the backrest structure by the location of the uprights in the crosspieces without any clearance.

2. A method as claimed in claim 1, wherein the backrest structure has at least two seats side by side, this structure having a third rigid, substantially vertical upright which extends between bottom and top ends joined respectively to the bottom and too crosspieces, the method comprising the following additional steps:

when hydroforming the bottom crosspiece, at least a third pair of orifices is punched into a top part of said bottom crosspiece, the third pair of orifices in the bottom crosspiece comprising two reciprocally matching orifices arranged respectively in the top part and in the bottom part of the bottom crosspiece and having sections matching the bottom end of the third upright, when hydroforming the top crosspiece, a least a third pair of orifices is punched into a bottom part of said top crosspiece, the third pair of orifices in the top crosspiece comprising two reciprocally matching orifices arranged respectively in the bottom part and in the top part of the top crosspiece and having sections matching the top end of the third upright, the bottom and top ends of the third upright are engaged without clearance respectively in the third pairs of orifices of the bottom and top crosspieces, and the third upright is definitively joined to the crosspieces in order to prevent the third upright from slipping out, mechanical strength essentially being imparted to the backrest structure by the location fit of the first, second and third uprights in the crosspieces without any clearance.

3. A method as claimed in claim 1 or claim 2, in which the uprights are definitively joined to the crosspieces by welding.

4. A a method as claimed in claim 1 or claim 2, in which the uprights are definitively joined to the crosspieces by clamping.

5. A structure for a seat backrest of a vehicle produced by a method as claimed in claim 1 or claim 2, made from steel.

6. A structure for a seat backrest of a vehicle produced by a method as claimed in claim 1 or claim 2, made from a material selected from aluminium and aluminium-based alloys.

7. A structure for a seat backrest of a vehicle as claimed in claim 6, in which the bottom and top crosspieces have gutters for fixing a cap covering the backrest, these gutters being cast from the same material with said crosspieces.

8. A structure for a seat backrest of a vehicle as claimed in claim 6, in which the bottom crosspiece forms flanges designed for pivotally mounting the backrest on the vehicle, these flanges being cast in the same material with said bottom crosspiece.

9. A structure for a seat backrest of a vehicle produced by a method as claimed in claim 1 or claim 2, in which the top crosspiece also has at least one additional punched orifice into which an element selected from the following is fixed:

a pin for a headrest, a riveted fixing insert, a backrest bolt, a plate for a backrest bolt, a mounting for a safety belt reel, an outlet for a safety belt strap.

10. A structure for a seat backrest of a vehicle produced by a method as claimed in claim 1 or claim 2 having at least one place for a user and the bottom crosspiece has a portion that is flattened on a substantially vertical plane on a level with this seat.

* * * * *